US008823883B2

(12) United States Patent
Kim et al.

(10) Patent No.: US 8,823,883 B2
(45) Date of Patent: Sep. 2, 2014

(54) SUPPORTING DEVICE FOR DISPLAY UNIT AND DISPLAY UNIT HAVING THE SAME

(75) Inventors: Sang Hak Kim, Hwaseong-si (KR); Eun Serb An, Yongin-si (KR); Hyun Jun Jung, Yongin-si (KR); Seung Hoon Oh, Yongin-si (KR); Sang Bong Jeon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 716 days.

(21) Appl. No.: 12/722,906

(22) Filed: Mar. 12, 2010

(65) Prior Publication Data

US 2010/0231815 A1    Sep. 16, 2010

(30) Foreign Application Priority Data

Mar. 12, 2009  (KR) .................. 10-2009-0021325

(51) Int. Cl.
*H04N 5/645* (2006.01)
*F16M 11/22* (2006.01)
*F16M 13/02* (2006.01)
*F16M 11/08* (2006.01)
*F16M 11/00* (2006.01)

(52) U.S. Cl.
CPC ............ *F16M 11/00* (2013.01); *F16M 11/22* (2013.01); *F16M 2200/08* (2013.01); *F16M 13/02* (2013.01); *F16M 11/08* (2013.01)
USPC ..... 348/825; 348/827; 248/309.1; 248/309.2; 248/132; 248/177.1; 248/634

(58) Field of Classification Search
CPC .. F16M 11/02; F16M 11/04; F16M 2200/021

USPC ................... 348/825–831; 248/125
See application file for complete search history.

(56) References Cited

U.S. PATENT DOCUMENTS 4,066,231 A * 1/1978 Bahner et al. ................. 248/552
4,239,171 A * 12/1980 Huls et al. .................... 248/558
(Continued)

FOREIGN PATENT DOCUMENTS

CN    2472036 Y    1/2002
CN    1764361 A  * 4/2006
(Continued)

OTHER PUBLICATIONS

IBM Technical Disclosure. "Swivel and Lift Platform for CRT Display" (Jan. 1985).*

(Continued)

*Primary Examiner* — Sath V Perungavoor
*Assistant Examiner* — Matthew J Anderson
(74) *Attorney, Agent, or Firm* — Sughrue Mion, PLLC

(57) ABSTRACT

A supporting device includes a support, serving to support a main body of the display unit, formed by injection molding using a transparent material. A display unit includes the supporting device. The display unit includes a main body having a screen and a supporting device to support the main body. The supporting device includes a support connected to the main body and a stand connected to the lower part of the support. The support includes a transparent member formed by injection molding using a transparent material. The transparent member is disposed between the main body and the stand to support the display unit, and is formed by insert injection molding.

31 Claims, 17 Drawing Sheets

(56) References Cited

U.S. PATENT DOCUMENTS

| | | | | |
|---|---|---|---|---|
| 4,684,089 A | * | 8/1987 | van der Lely | 248/124.1 |
| 4,981,638 A | * | 1/1991 | Schad et al. | 264/297.2 |
| 5,243,434 A | * | 9/1993 | Nodama | 348/827 |
| 5,760,323 A | * | 6/1998 | Romero et al. | 84/470 R |
| 6,041,545 A | * | 3/2000 | Sofy et al. | 47/40.5 |
| 6,659,679 B2 | * | 12/2003 | Humm et al. | 403/343 |
| 6,809,713 B2 | * | 10/2004 | Peng | 345/87 |
| 7,195,214 B2 | * | 3/2007 | Lee et al. | 248/125.8 |
| D542,296 S | * | 5/2007 | Bockheim et al. | D14/451 |
| 7,320,454 B2 | * | 1/2008 | Lee et al. | 248/343 |
| 7,395,992 B2 | * | 7/2008 | Jung | 248/176.3 |
| 7,395,995 B2 | * | 7/2008 | Chen | 248/284.1 |
| 7,440,038 B2 | * | 10/2008 | Kato | 348/794 |
| 7,733,645 B2 | * | 6/2010 | Hsu | 361/679.59 |
| D625,302 S | * | 10/2010 | Kasuga et al. | D14/239 |
| 7,854,422 B2 | * | 12/2010 | Kameoka et al. | 248/349.1 |
| 7,866,615 B2 | * | 1/2011 | Hsuan et al. | 248/188.8 |
| 7,876,315 B2 | * | 1/2011 | Suzuki et al. | 345/211 |
| 7,889,486 B2 | * | 2/2011 | Chiang et al. | 361/679.22 |
| 7,983,029 B2 | * | 7/2011 | Park | 361/679.22 |
| 8,094,244 B2 | * | 1/2012 | Sawai et al. | 348/836 |
| 8,280,274 B2 | * | 10/2012 | Jung et al. | 399/100 |
| 8,493,723 B2 | * | 7/2013 | Sakata et al. | 361/679.22 |
| 2003/0151701 A1 | * | 8/2003 | Sedighzadeh | 348/825 |
| 2006/0071135 A1 | * | 4/2006 | Trovato | 248/289.11 |
| 2006/0086867 A1 | * | 4/2006 | Wang | 248/125.8 |
| 2007/0181768 A1 | * | 8/2007 | Choi et al. | 248/415 |
| 2007/0210223 A1 | * | 9/2007 | Lee et al. | 248/178.1 |
| 2007/0215762 A1 | * | 9/2007 | Lee et al. | 248/125.7 |
| 2008/0068784 A1 | * | 3/2008 | Bouissiere | 361/681 |
| 2008/0116328 A1 | | 5/2008 | Wang | |
| 2008/0164395 A1 | * | 7/2008 | Chang et al. | 248/276.1 |
| 2008/0239640 A1 | | 10/2008 | Park | |
| 2008/0258030 A1 | * | 10/2008 | Hsuan et al. | 248/346.03 |

FOREIGN PATENT DOCUMENTS

| | | | |
|---|---|---|---|
| CN | 1796702 A | | 7/2006 |
| CN | 101094572 A | | 12/2007 |
| CN | 201170422 Y | | 12/2008 |
| EP | 1762771 A2 | | 3/2007 |
| EP | 1870630 A2 | | 12/2007 |
| EP | 1975500 A2 | | 10/2008 |
| JP | 2007267260 A | * | 10/2007 |
| JP | 2009243606 A | * | 10/2009 |
| KR | 10-2007-0030714 A | | 3/2007 |
| KR | 2009022314 A | * | 8/2007 |
| KR | 10-2008-0088179 A | | 10/2008 |
| KR | 2008008179 A | * | 10/2008 |

OTHER PUBLICATIONS

Communication dated Apr. 5, 2012 issued by the European Patent Office in European Application No. 10156054.8.

Communication, dated May 20, 2013, issued by the State Intellectual Property Office of P.R. China in counterpart Chinese Patent Application No. 201010132967.7.

Communication dated Apr. 1, 2014 issued by the State Intellectual Property Office of P.R. China in counterpart Chinese Patent Application No. 201010132967.7.

* cited by examiner

SUPPORTING DEVICE FOR DISPLAY UNIT AND DISPLAY UNIT HAVING THE SAME

CROSS-REFERENCE TO RELATED APPLICATIONS

This application claims priority under priority under 35 U.S.C. §119(a) from Korean Patent Application No. 2009-0021325, filed on Mar. 12, 2009 in the Korean Intellectual Property Office, the disclosure of which is incorporated herein by reference in its entirety.

BACKGROUND

1. Field of the Invention

The present general inventive concept relates to a supporting device of a display unit having an improved structure, in which a support, serving to support a main body of the display unit, is made of a transparent material, and a display unit having the same.

2. Description of the Related Art

Recently, display units, such as an LCD (liquid crystal display) and a PDP (plasma display panel), have been developed with an increased screen size and a reduced thickness, and thus are widely employed by many users. These display units display an image having excellent quality, and have a thin thickness and thus occupy less space. Further, these display units may be mounted directly on the surface of an indoor wall, and if a separate supporting device is used, may be installed on an indoor floor or a table.

Such a panel-type display unit includes a supporting device, which allows the display unit to be installed in an erect state on an indoor floor. The supporting device includes a stand supported on the floor under the condition that the stand is horizontally spread, and a support installed between a main body of the display unit and the stand to support the main body of the display unit.

However, the support of the supporting device to connect the stand and the main body of the display unit is visible to a user, thus spoiling the external appearance of the display unit.

Further, since a connection state between the main body of the display unit and the stand is visible to a user, as it is, the support decreases a three-dimensional effect of an image displayed on a screen of the display unit.

SUMMARY

The present general inventive concept provides a supporting device for a display unit, which improves the external appearance of the display unit, and a display unit having the same.

The present general inventive concept also provides a supporting device for a display unit, which causes the display unit to appear to be mounted on the surface of a wall, and a display unit having the same.

The present general inventive concept also provides a supporting device for a display unit, which simplifies the structure of a support, and a display unit having same.

Additional aspects of the invention will be set forth in part in the description which follows and, in part, will be obvious from the description, or may be learned by practice of the invention.

Exemplary embodiments of the present general inventive concept may be achieved by providing a supporting device for a display unit including a support connected to the display unit, and a stand connected to a lower part of the support, wherein the support includes a transparent member formed by injection molding using a transparent material, and the transparent material is disposed between the display unit and the stand to support the display unit.

The transparent member may include a core part and an injection molded part surrounding an external surface of the core part to form an external appearance of the transparent member.

The transparent member may be formed by insert injection molding, in which the injection molded part is formed by inserting the core part into an injection mold and then carrying out injection molding at the external surface of the core part.

The core part may include an extruded rod formed by extrusion molding.

The extrusion rod may be colored.

The transparent member may include at least one selected from the group consisting of polycarbonate, acryl, and crystal.

The supporting device may further include a decorative cover disposed between the support and the stand and surrounding an outer circumferential surface of a lower part of the support when the lower part of the support is inserted into the decorative cover.

The supporting device may further include a rear plate coupled with the display unit to connect the display unit and the support.

The supporting device may further include a stand-bracket connected to a lower surface of the stand opposite from a surface of the stand facing the display unit.

The supporting device may further include a swivel-bracket connected to the support via through holes respectively formed at central regions of the stand and the stand-bracket.

The supporting device may further include swivel-rings to allow the display unit to be rotatable.

The swivel-rings may include a swivel-ring-top interposed between the support and the stand, and a swivel-ring-bottom interposed between the stand-bracket and the swivel-bracket.

The stand and the stand-bracket may be connected by a double-sided tape.

Each of the stand and the stand-bracket may further include at least one rubber foot formed at corners of the lower surface thereof to support the stand and the stand-bracket on a mounting surface of the display unit.

The transparent member may include a neck, and the support may further include neck-holder-tops provided at an upper part of the neck and connected to the rear plate to prevent separation of the neck from the rear plate, and neck-holder-bottoms provided at a lower part of the neck and connected to the stand to prevent separation of the neck from the stand.

The support may further include a bracket-neck connected to the lower part of the transparent member by the double-sided tape.

The neck, the neck-holder-tops, the neck-holder-bottoms, and the neck-brackets may be integrally formed by injection molding.

The neck-holder-tops may include a first neck-holder-top and a second neck-holder-top interconnected by fasteners, and the first neck-holder-top and the second neck-holder-top may be connected to a groove formed on the upper part of the neck, and the neck-holder-bottoms may include a first neck-holder-bottom and a second neck-holder-bottom interconnected by fasteners, and the first neck-holder-bottom and the second neck-holder-bottom may be connected to a groove formed on the lower part of the neck.

The supporting device may further include a neck-bottom provided with a screw groove formed on an inner circumferential surface thereof and connected to an upper surface of the stand, wherein the transparent member may include a neck made of a transparent material and provided with screw threads respectively formed on outer circumferential surfaces of upper and lower parts thereof, and the screw thread at the lower part of the neck may be threaded to the screw groove of the neck-bottom and the screw thread at the upper part of the neck may be threaded to a screw thread formed on the rear plate.

The transparent member may include a neck made of a transparent material and provided with upper and lower grooves respectively formed on outer circumferential surfaces of upper and lower parts thereof, and the support may further include neck-brackets respectively provided with a plurality of blades to connect to the upper and lower grooves of the neck, wherein the plurality of blades may be bent to connect the neck-brackets to the neck.

The transparent member may include a cylindrical neck provided with a rubber member inserted into an outer circumferential surface of a lower part thereof, and the support may further include a neck-holder provided with a screw thread formed on an outer circumferential surface thereof and a cut part formed at one side thereof wherein the rubber member is inserted into the neck-holder, and a fix-ring threaded to the screw thread of the neck-holder to compress the neck-holder onto the rubber member.

Exemplary embodiments of the present general inventive concept may also be achieved by providing a display unit including a main body having a screen and a supporting device to support the main body, wherein the supporting device includes a support connected to the main body and a stand connected to a lower part of the support, the support including a transparent member formed by injection molding using a transparent material and disposed between the main body and the stand to support the display unit, wherein the transparent member is formed by insert injection molding.

The transparent member may include a core part and an injection molded part surrounding an external surface of the core part to form an external appearance of the transparent member, and the transparent member may be formed by insert injection molding in which the injection molded part is formed by inserting the core part into an injection mold and then carrying out injection molding at the external surface of the core part.

The supporting device may further include a decorative cover disposed between the support and the stand and surrounding an outer circumferential surface of the lower part of the support when the lower part of the support is inserted into the decorative cover.

The supporting device may further include a rear plate coupled with the display unit to connect the display unit and the support.

The supporting device may further include a stand-bracket connected to a lower surface of the stand opposite from a surface of the stand facing the display unit.

The supporting device may further include a swivel-bracket connected to the support via through holes respectively formed at central regions of the stand and the stand-bracket.

The supporting device may further include swivel-rings to allow the main body to be rotatable.

The swivel-rings may include a swivel-ring-top interposed between the support and the stand, and a swivel-ring-bottom interposed between the stand-bracket and the swivel-bracket.

Exemplary embodiments of the present general inventive concept may also be achieved by providing a supporting device usable with a display unit, including a stand disposed to have a distance with a main body of the display unit, and a support connected to the stand and the main body, disposed between the stand and the main body, and having a transparent member made of a transparent material to be disposed within the distance between the stand and the main body.

The transparent member of the support may be exposed to an outside thereof between the stand and the main body.

The support may further include an upper part connectable to the main body and a lower part connectable to the stand, and the upper part and the lower part are made of one of the transparent material and a non-transparent material.

The upper part and the lower part may not be exposed to an outside thereof, and the transparent member may be exposed to the outside thereof between the stand and the main body.

The support having the transparent member may be movable with respect to at least one of the main body and the stand.

The support having the transparent member may be movable together with one of the main body and the stand and may not be moveable with respect to the other one of the main body and the stand.

Exemplary embodiments of the present general inventive concept may also be achieved by providing a display unit including a main body having a screen to display an image, and a supporting device to support a main body with respect to a reference surface, and including a stand disposed to have a distance with the main body of the display unit with respect to the reference surface, and a support connected to the stand and the main body, disposed between the stand and the main body, and having a transparent member made of a transparent material to be disposed within the distance between the stand and the main body.

The transparent member may have a height to correspond to the distance in a direction having an angle with the reference surface and may have a width narrower than a width of the stand and the main body in a direction corresponding to the reference surface.

The transparent member may be exposed to an outside thereof between the stand and the main body when the stand and the main body are connected through the support

BRIEF DESCRIPTION OF THE DRAWINGS

These and/or other features and/or utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
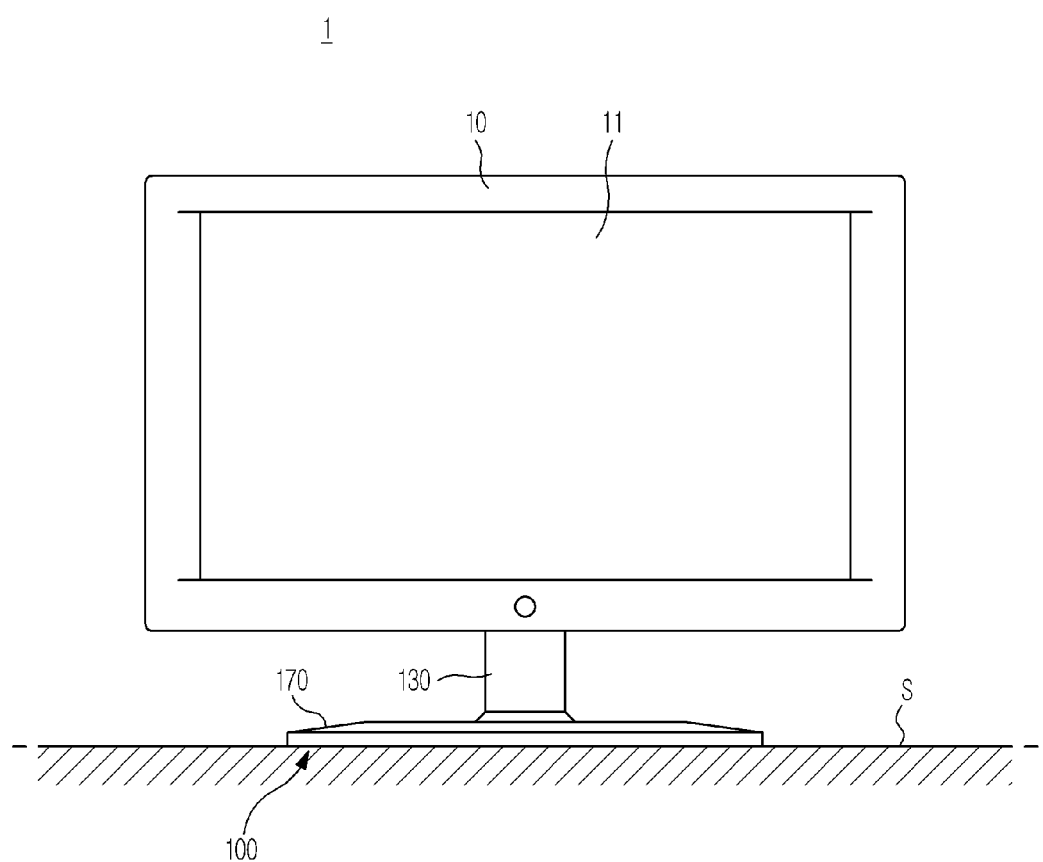
FIG. 1 is a front view of a display unit, to which a supporting device in accordance with an exemplary embodiment of the present general inventive concept is applied.

Reference will now be made in detail to exemplary embodiments of the present general inventive concept, examples of which are illustrated in the accompanying drawings, wherein like reference numerals refer to like elements throughout. The exemplary embodiments are described below in order to explain the present general inventive concept by referring to the figures.

Figure 2:
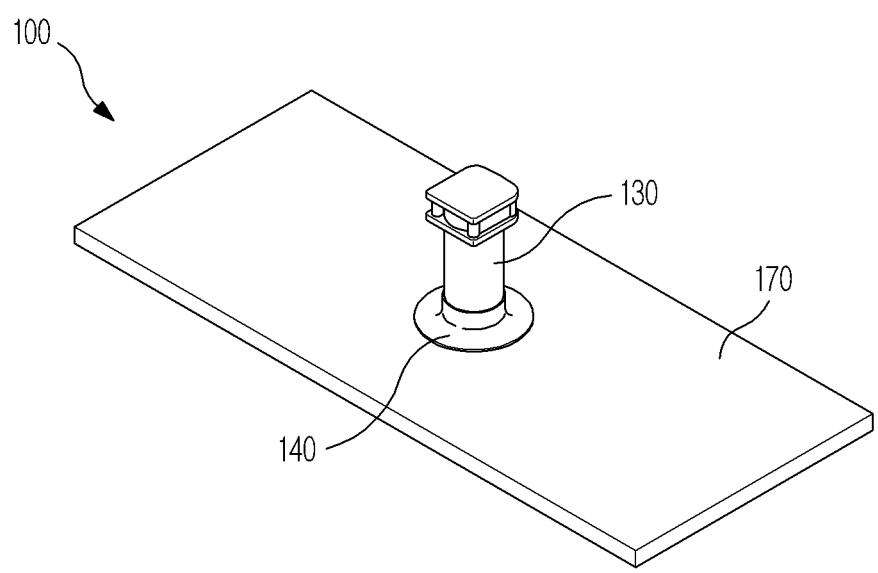
FIG. 2 is a perspective view of the supporting device of FIG. 1.
Figure 3:
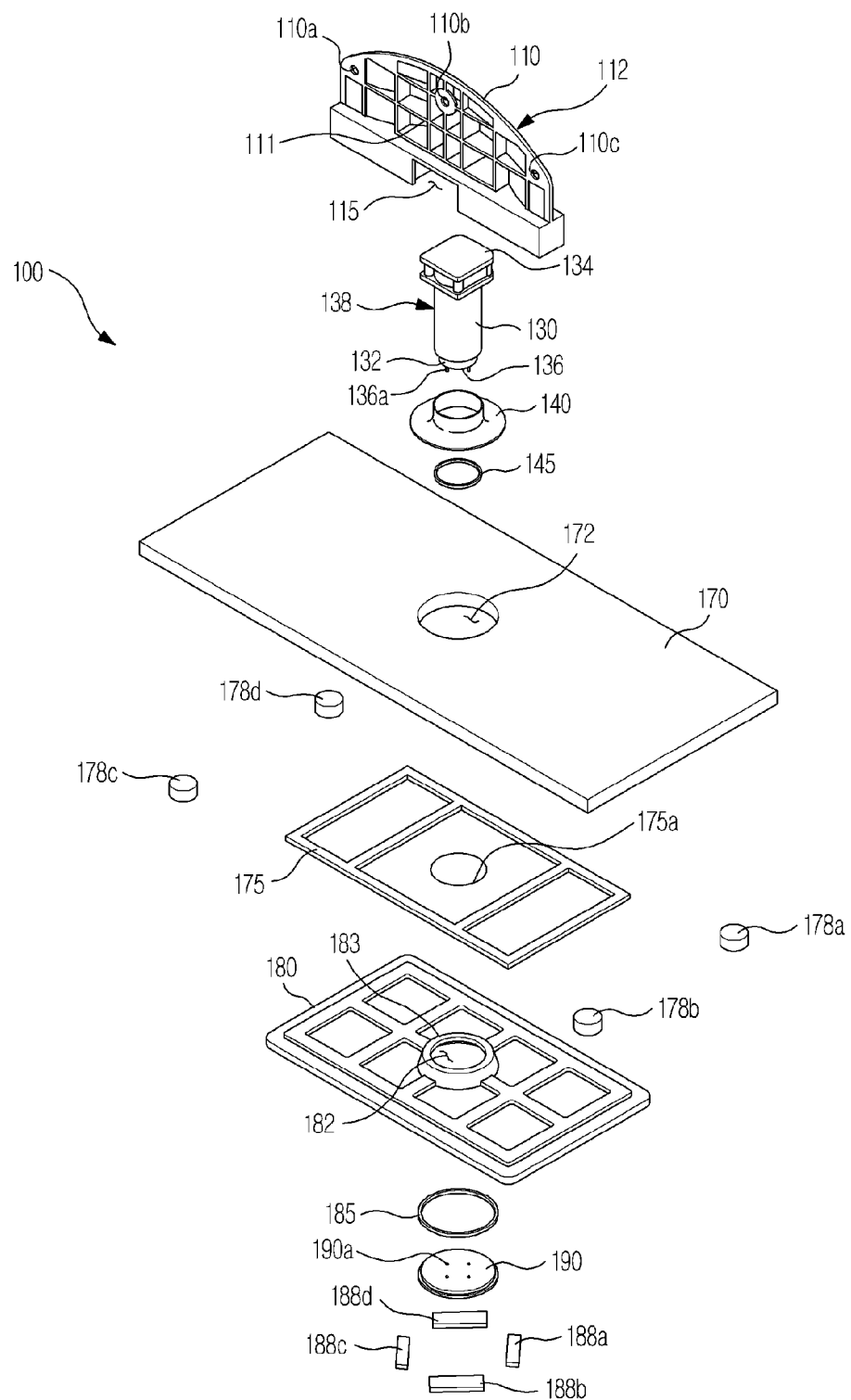
FIG. 3 is an exploded perspective view of FIG. 2.

FIG. 1 is a front view of a display unit, to which a supporting device in accordance with an exemplary embodiment of the present general inventive concept is applied, FIG. 2 is a perspective view of the supporting device of FIG. 1, and FIG. 3 is an exploded perspective view of FIG. 2.

With reference to FIG. 1, a display unit 1 in accordance with this exemplary embodiment includes a main body 10 having a screen 11, and a supporting device 100 to support the main body 10 with respect to a reference surface S. The main body 10 can be a thin TV, such as an LCD or a PDP.

The support device 100 supports the main body 10 in an erect state or in a state having an angle with the reference surface S. The reference surface S may be a table, a furniture surface, a wall, etc. However, the present general inventive concept is not limited thereto. The reference surface S may be a surface to support to the main body 10. When the reference surface S is not parallel to a horizontal direction, it is possible that the support device 100 include a contact element (not illustrated) to contact the reference surface S and a connecting element (not illustrated) to detachably couple the contact element to the reference surface S, so that the main body 10 does not slide away or fall from the reference surface S. It is possible that the connecting element is a screw to fixedly connect the support device 100 to the reference surface S.

As illustrated in FIGS. 2 and 3, the supporting device 100 includes a rear plate 110 to connect to a rear surface of the main body 10, a support 130 to connect to a hole 115 of the rear plate 110 to support the main body 10, a stand 170 to connect to the lower part of the support 130, and a stand-bracket 180 to be mounted on the lower surface of the stand 170 and to be disposed on the reference surface S. The stand 170 may be a rectangular shape with respect to the reference surface S. However, it is possible that the stand can have another shape, such as a circular shape, a non-circular shape, a triangular shape, a symmetrical shape, an asymmetrical shape, etc.

The rear plate 110 can have a front surface 111 and a rear surface 112. The rear plate 110 can be connected to the rear surface of the main body 10 at the front surface 111 of the rear plate 110 by, for example, fasteners such as screws (not illustrated), and the hole 115, into which the upper part of the support 130, which will be described later, is inserted, is formed at a central region of the lower part of the rear plate 110. The rear plate 110 maintains contact of an area with the rear surface of the main body 10 such that the main body 10 is erectable, and transmits a load of the main body 10 to the support 130.

The support 130 includes a transparent member 138 made of a transparent material. The transparent member 138 is installed between the main body 10 and the stand 170 and serves to support the main body 10. The upper part 134 of the support 130 is inserted into the hole 115 of the rear plate 110 and is connected to the rear plate 110 by fasteners, such as screws (not illustrated), and the lower part of the support 130 passes through the stand 170 and the stand-bracket 180, which is further described below, and is connected to a swivel-bracket 190 by screws (not illustrated). Before the support 130 is inserted into the stand 170, a decorative cover 140 is inserted into a groove 132 formed along the outer circumferential surface of the lower part of the support 130. The decorative cover 140 is a structure to decorate the external appearance of the supporting device 100. The support 130 will be described later in detail with reference to FIG. 4.

It is possible that the support 130 is made of the transparent material as a single monolithic body. It is also possible that the support 130 can be formed with at least two bodies connected to each other, and at least one of the at least two bodies can be made of the transparent material. The at least one of the at least two bodies made of the transparent material can be exposed between the main body 10 and the stand 170.

The transparent member 138 may have a height correspond to a distance between the stand 170 and the main body 10 of the display unit 1 with respect to the reference surface S. It is possible that the height may be shorter than the distance. However, at least a portion of the transparent member 138 may be exposed outside within the distance between the stand 170 and the main body 10 when the stand 170 and the main body 10 are connected to each other through the supporting device 100.

The transparent member 130 may have a width corresponding to a width of the stand 170 and the main body 10 with respect to a direction parallel to the reference surface S. It is possible that the width of the transparent member 130 can be narrower than at least one of the stand 170 and the main body 10. It is possible that the width of the transparent member 130 can be thicker than a thickness of the stand 170 with respect to the reference surface S.

The stand 170 can be, for example, a glass plate, which can have a rectangular shape and can be provided with a through hole 172 formed at a central region thereof. Silk screen printing can be carried out on the stand 170. The stand 170 serves to uniformly disperse the load of the main body 10 transmitted from the support 130 throughout a mounting surface and to stably support the main body 10.

The stand-bracket 180 can be connected to a lower surface of the stand 170 by, for example, an adhesive such as double-sided tape 175, and serves to reinforce the strength of the stand 170. In the same manner as the stand 170, a through hole 182 is formed at a central region of the stand-bracket 180. However, the stand-bracket 180 can be made of a heavy, dense material, such as iron, differing from the stand 170. The double-sided tape 175 can also have a hole 175a formed in a central region thereof to correspond with the through hole 182 of the stand-bracket 180 and with the through hole 172 of the stand 170.

Further, two swivel-rings 145 and 185 are installed during an assembly process of the supporting device 100. The swivel-rings 145 and 185 are made of plastic, and serve to assist rotation of the main body 10 relative to the stand 170. That is, the swivel-rings 145 and 185 serve as intermediates to facilitate rotation of the support 130 between the support 130 and the stand 170 and between the support 130 and the stand-bracket 180. The swivel-rings 145 and 185 include a swivel-ring-top 145 inserted into the through hole 172 of the stand 170, and a swivel-ring-bottom 185 inserted into a groove 183 at the outside of the through hole 182 of the stand-bracket 180.

The support 130 may further include protrusions 136a to be received in or coupled to receptacles 190a formed in the swivel bracket 90 through the stand 170 such that the support 130 can be supported or held by the stand 170.

In order to prevent scratches on the mounting surface of the display unit 1, rubber feet 178a, 178b, 178c, 178d, 188a, 188b, 188c, and 188d are installed. The rubber feet 178a, 178b, 178c, and 178d can be installed at respective corners of the lower surface of the stand 170, and the rubber feet 188a, 188b, 188c, and 188d can be installed at respective corners of the stand-bracket 180. The rubber feet 178a, 178b, 178c, 178d, 188a, 188b, 188c, and 188d can be made of rubber, and are separated from each other at designated intervals so as to prevent the contact of the stand 170 and the stand-bracket 180 with the mounting surface.

Figure 4:
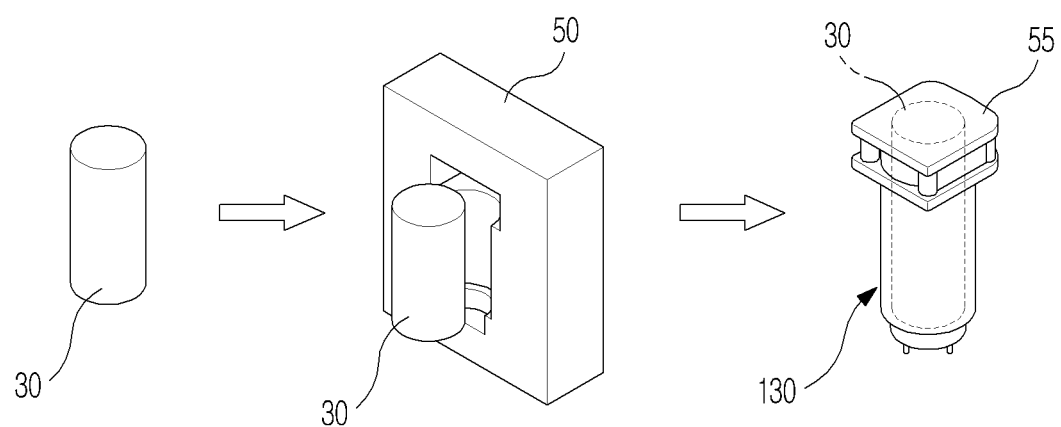
FIG. 4 is a detailed view illustrating an exemplary manufacturing process of a support of the supporting device.
Figure 5A:
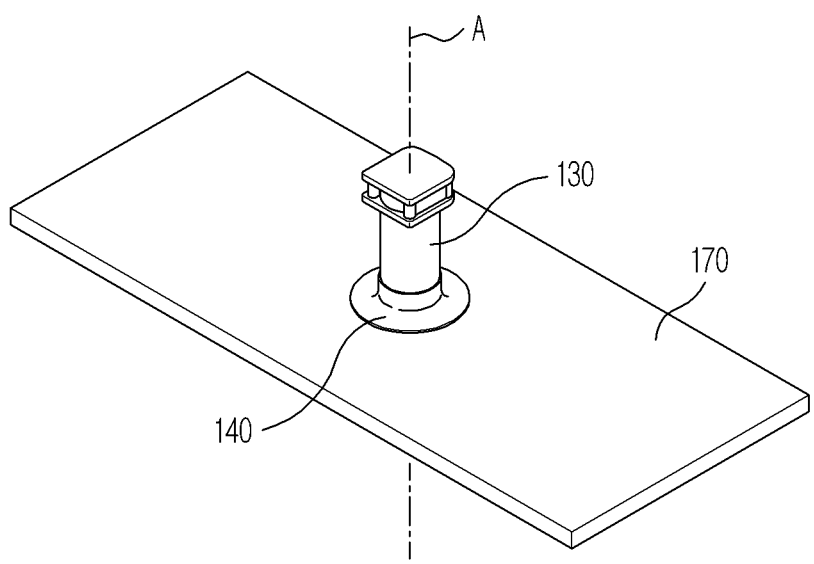
FIG. 5A is a perspective view illustrating an insertion of the support into a stand during an exemplary assembly process of the supporting device.
Figure 5B:
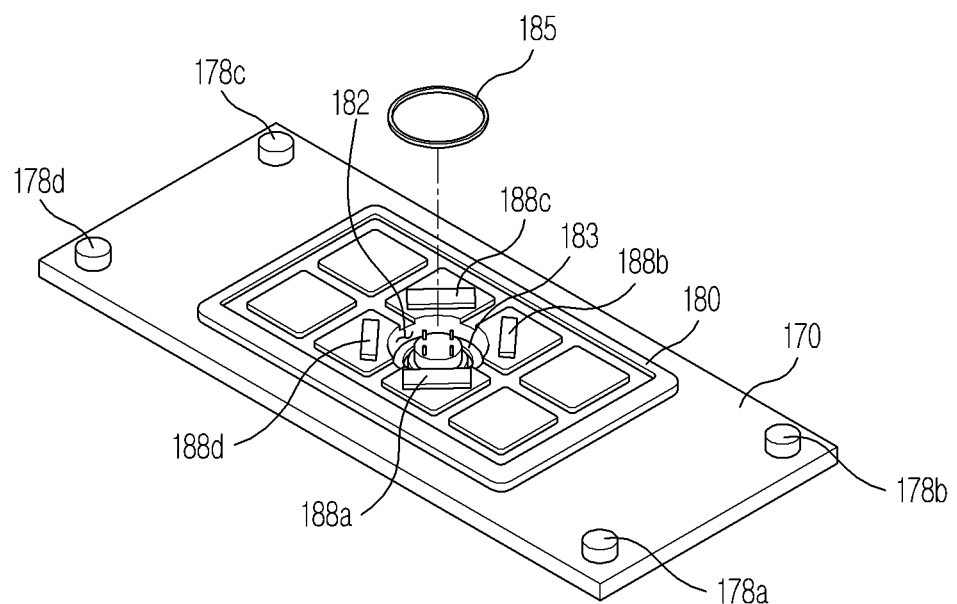
FIG. 5B is a perspective view illustrating an insertion of a swivel-ring-bottom into a stand-bracket during an exemplary assembly process of the supporting device.
Figure 5C:
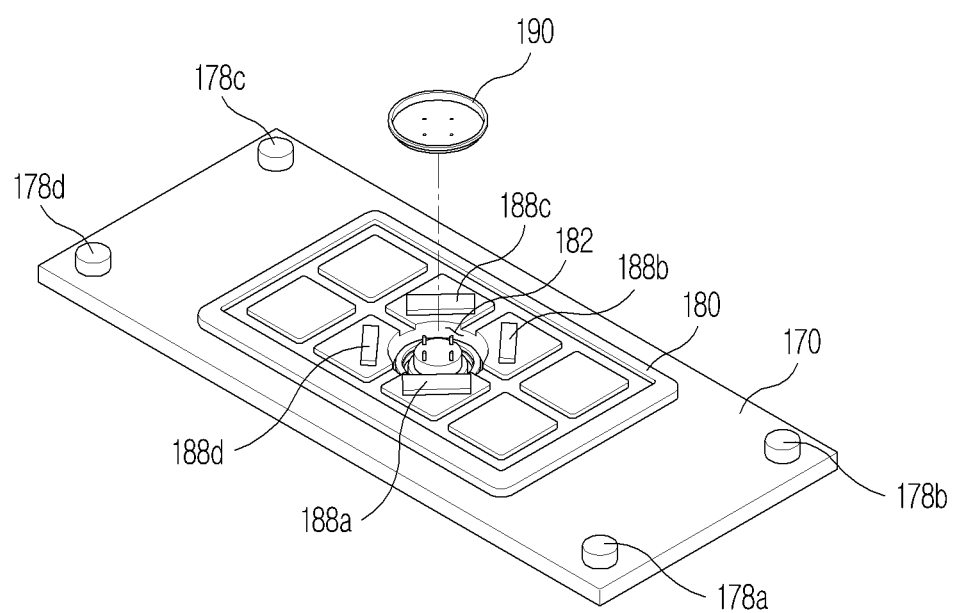
FIG. 5C is a perspective view illustrating a coupling of a swivel-bracket with the support during an exemplary assembly process of the supporting device.

FIG. 4 is a detailed view illustrating an exemplary process of manufacturing the support 130 of the supporting device 100, FIG. 5A is a perspective view illustrating an insertion of the support 130 into the stand 170 during an exemplary assembly process of the supporting device 100, FIG. 5B is a perspective view illustrating an insertion of the swivel-ring-bottom 185 into the stand-bracket 180 during an exemplary assembly process of the supporting device 100, and FIG. 5C is a perspective view illustrating a coupling of the swivel-bracket 190 with the support 130 during an exemplary assembly process of the supporting device 100.

Hereinafter, an exemplary manufacturing process of the support 130 and an exemplary assembly process of the supporting device 100 will be described in detail.

With reference to FIG. 4, the transparent member of the support 130 includes an extruded rod 30 to serve as a core part which can be formed, for example, by extrusion molding, and an injection molded part 55 formed at the outside of the extruded rod 30 by carrying out insert injection molding using the extruded rod 30. That is, the extruded rod 30 can be formed by extruding transparent polycarbonate or transparent acryl, and the injection molded part 55 can be formed at the outside of the extruded rod 30 by inserting the extruded rod 30 into an injection mold 50 and carrying out insert injection molding of the same material as the extruded mold 30. Thereby, a transparent member having transparency can be obtained, and the support 130 including the transparent member can be manufactured. The transparent member having transparency obtained by insert injection molding using the extruded rod 30 has a short cooling time, compared with a general injection molded product. Further, since the transparent member is integrally formed by insert injection molding, the supporting device 100 is completed only by connecting the support 130 to the rear plate 110 and the swivel-bracket 190 using screws (not shown) without separate parts. Therefore, the supporting device 100 has a simple structure, reduces material costs, and increases productivity. Although the support 130 in the above exemplary embodiment is manufactured by insert injection molding, this is not a limitation, and in another exemplary embodiment, for example, the transparent member of the support 130 may be manufactured by processing crystal into the shape of the support 130. In addition, the transparent member 138 of the support 130 can include the upper part of the support 134 and the lower part of support 136, or it can include just a central portion of the support 130.

The rear plate 110 is attached to the main body 10, the hole 115 can be defined by the rear plate 110 and the main body 10. The upper part 134 of the support 130 can be disposed in the hole 115 and supported or held by the rear plate 110 and/or the main body 10. The hole 115 may have a shape to correspond to a shape of the upper part 134 of the support 130.

It is possible that the upper part 134 and the lower part 136 can be made of the transparent material. However, it is possible that the upper part 134 and the lower part 136 are not part of the transparent member 138. That is, the upper part 134 and the lower part 136 may be made of a non-transparent material, semi-transparent material, or translucent material.

The support 130 may move together with the main body 10, and may be moveable with respect to the stand 170. However, the present general inventive concept is not limited thereto. It is possible that the support 130 may movable with respect to the main body and the stand 170.

Further, before the extruded rod 30 is inserted into the injection mold 50, the extruded rod 130 may be colored. When the extruded rod 130 is colored, the transparent member obtained by insert injection molding is colored, thereby providing an aesthetic complement to the display unit 1 as well as transparency.

With reference to FIGS. 5A to 5C, an exemplary assembly process of the supporting device 100 will be described. The decorative cover 140 is assembled with the lower groove 132 of the transparent member of the support 130 obtained, for example, by insert injection molding using the extruded rod 30, and the support 130 with the decorative cover 140 is connected to the stand 170 substantially along a line illustrated as line A (FIG. 5A). The stand-bracket 180 is mounted on the lower surface of the stand 170 by the double-sided tape 175, and the respective rubber-feet 178a, 178b, 178c, 178d, 188a, 188b, 188c, and 188d are mounted on the stand 170 and the stand-bracket 180 (FIG. 5B). Further, the swivel-ring-top 145 is inserted between the support 130 and the stand-bracket 180 (as illustrated in FIG. 3).

Thereafter, the assembly of the support 130 and the stand 170 is turned over, and the swivel-ring-bottom 185 is inserted into the groove 183 at the outside of the through hole 182 of the stand-bracket 180 (FIG. 5B). Then, the swivel-bracket 190 is connected to the lower part of the support 130 by screws (not illustrated) (FIG. 5C). Finally, the assembly is turned over again, the rear plate 110 is connected to the upper part of the support 130 by fasteners, such as screws (not illustrated), and the main body 10 is connected to the front surface 111 of the rear plate 110. When a user applies a force to the completed display unit 1, the main body 10 and the support 130 can be rotated right and left relative to the stand 170 using the swivel-rings 145 and 185 as intermediates. That is, the swivel-rings 145 and 185 serve as intermediates to facilitate the rotation of the support 130 between the support 130 and the stand 170 and between the support 130 and the stand-bracket 180.

Hereinafter, other exemplary embodiments of the present general inventive concept will be described.

Figure 6A:
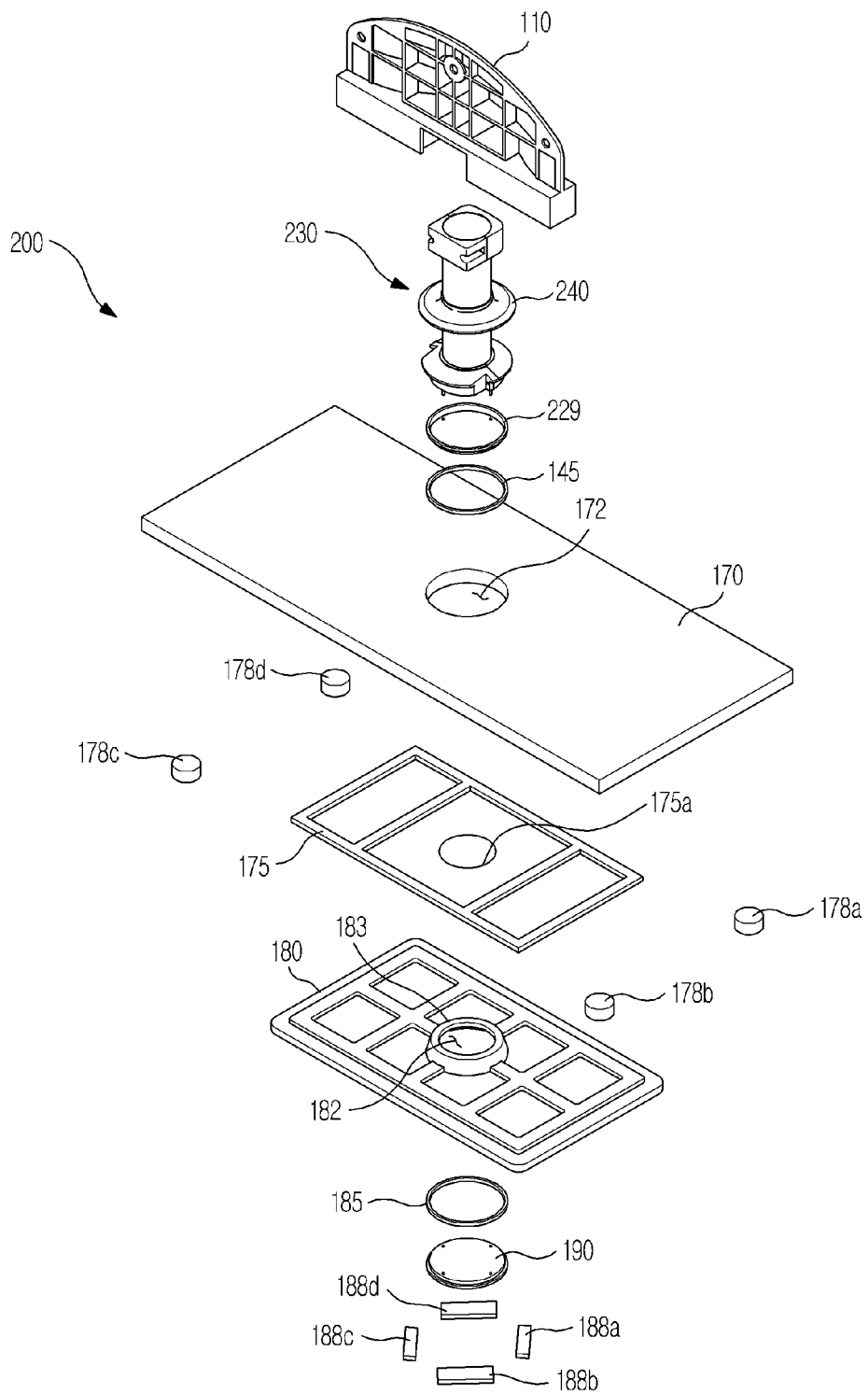
FIG. 6A is a perspective view illustrating a supporting device in accordance with another exemplary embodiment of the present general inventive concept.
Figure 6B:
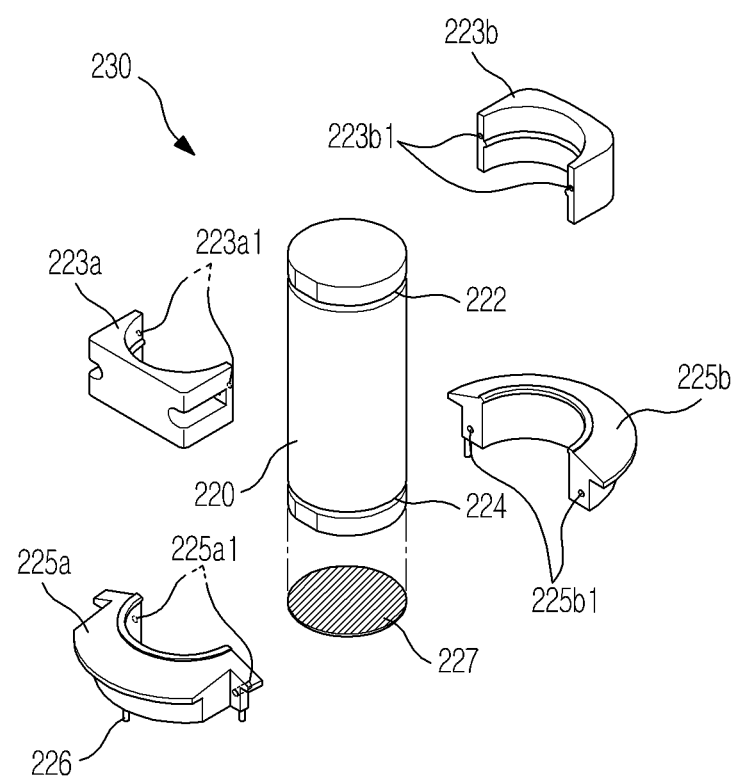
FIG. 6B is a detailed view illustrating a connection of a neck, neck-holder-tops, neck-holder-bottoms, and a double-sided tape during an exemplary assembly process of a support.
Figure 6C:
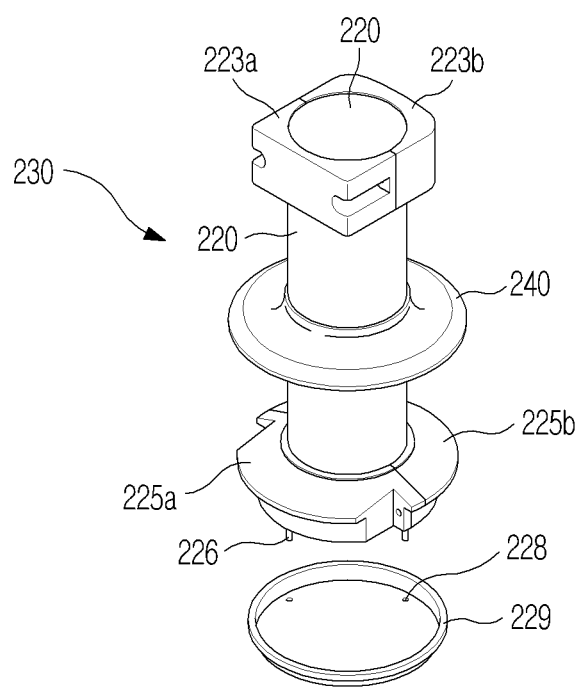
FIG. 6C is a detailed view illustrating a connection of a bracket-neck to the neck during an exemplary assembly process of the support.

FIG. 6A is a perspective view illustrating a supporting device in accordance with another exemplary embodiment of the present general inventive concept, FIG. 6B is a detailed view illustrating a connection of a neck, neck-holder-tops, neck-holder-bottoms, and a double-sided tape during an exemplary assembly process of a support, and FIG. 6C is a detailed view illustrating a connection of a bracket-neck to the neck during an exemplary assembly process of the support.

With reference to FIGS. 6A to 6C, a supporting device 200 in accordance with an exemplary embodiment of the present general inventive concept is the same as the supporting device 100 in accordance with the exemplary embodiment illustrated in FIGS. 1 to 5C except that a support 230 of the supporting device 200 differs from the support 130 of the supporting device 100. That is, as illustrated in FIGS. 6A and 6B, the support 230 includes a cylindrical neck 220 obtained, for example, by injection molding using a transparent material, and the support 230 also includes grooves 222 and 224, to which neck-holder-tops 223a and 223b and neck-holder-bottoms 225a and 225b, which will be described later, are connected. The grooves 222 and 224 can be respectively formed on the upper and lower parts of the neck 220.

The neck-holder-tops 223a and 223b are connected to the upper groove 222 of the neck 220. The neck-holder-tops 223a and 223b include a first neck-holder-top 223a and a second neck-holder-top 223b, and the first neck-holder-top 223a and the second neck-holder-top 223b are connected to the upper groove 222 by fasteners such as, for example, screws (not illustrated), at holes 223a1 and 223b1. The neck-holder-bottoms 225a and 225b are connected to the lower groove 224 of the neck 220. The neck-holder-bottoms 225a and 225b include a first neck-holder-bottom 225a and a second neck-holder-bottom 225b, and the first neck-holder-bottom 225a and the second neck-holder-bottom 225b are connected to the lower groove 224 by fasteners, such as screws (not illustrated), at holes 225a1 and 225b1. Before the neck-holder tops 223a and 223b and the neck-holder bottoms 225a and 225b are connected to the neck 220, a decorative cover 240 can be connected to a middle part of the neck 220. Further, an adhesive such as double-sided tape 227 can be attached to the lower surface of the neck 220, and a bracket-neck 229 can be connected to the neck 220 by the double-sided tape 227. Here, guide bosses 226 formed on the neck-holder-bottoms 225a and 225b can be inserted into holes 228 of the bracket-neck 229. The double-sided tape 227 may have a thickness appropriate to attach the neck 220 to the bracket-neck 229, which can be, 0.4 mm. Also, in place of (or in addition to) the double-sided tape 227, the neck 220 may be attached to the bracket-neck 229 with fasteners, such as screws.

The neck 220, the neck-holder-tops 223a and 223b, the neck-holder-bottoms 225a and 225b, and the bracket-neck 229 may be separately formed, as described above, or, in another exemplary embodiment. the neck 220, the neck-holder-tops 223a and 223b, the neck-holder-bottoms 225a and 225b, and the bracket-neck 229 may be integrally formed by injection molding.

The remaining elements of the supporting device 200 in this exemplary embodiment are the same as those of the supporting device 100 in the embodiment illustrated in FIGS. 1 to 5C, so detailed description of those elements will be omitted for conciseness.

Figure 7:
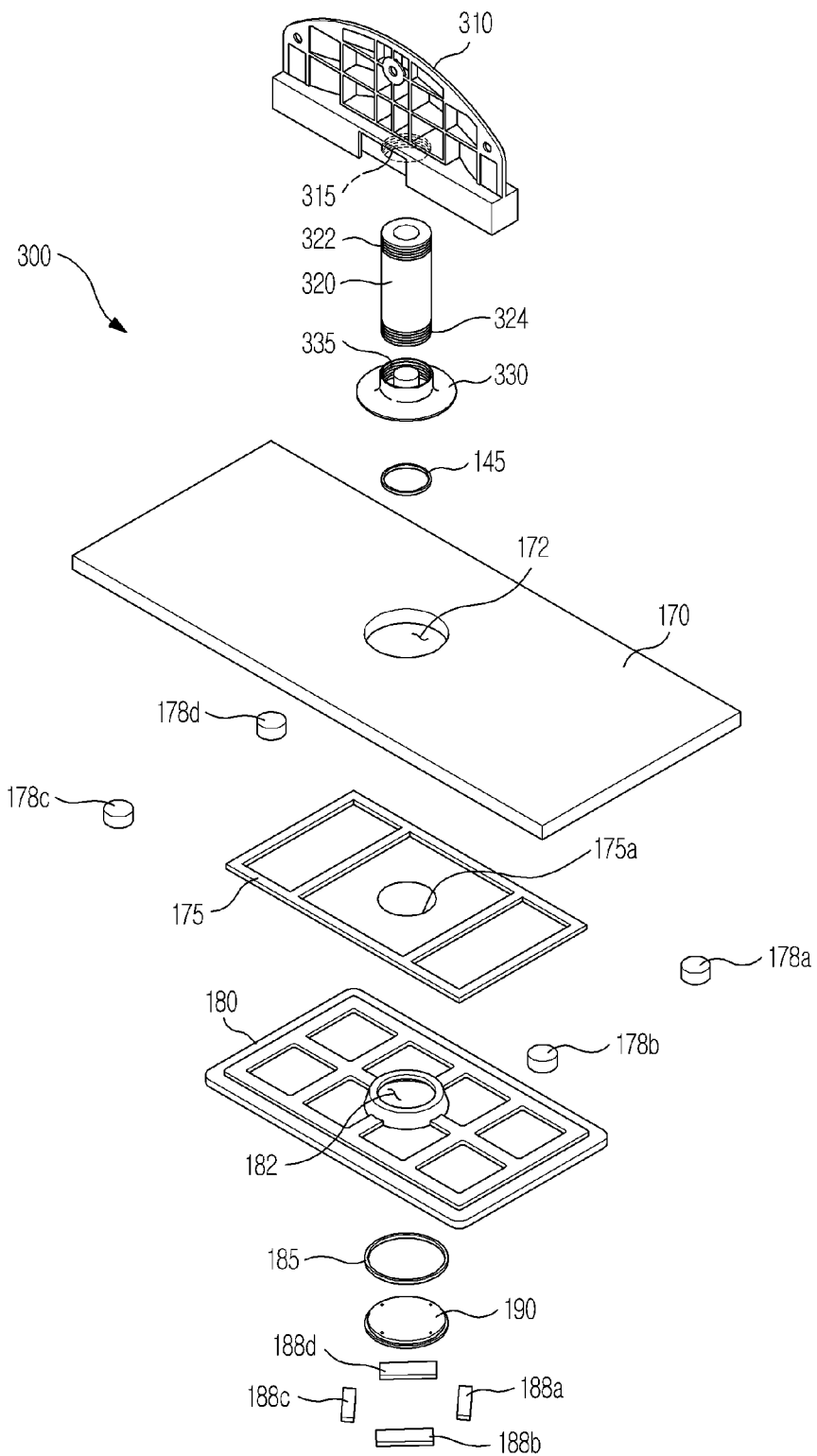
FIG. 7 is an exploded perspective view illustrating a supporting device in accordance with another exemplary embodiment of the present general inventive concept.

FIG. 7 is an exploded perspective view illustrating a supporting device in accordance with another exemplary embodiment of the present general inventive concept.

With reference to FIG. 7, a supporting device 300 in accordance with an exemplary embodiment of the present general inventive concept is the same as the supporting device 100 in accordance with the exemplary embodiment illustrated in FIGS. 1 to 5C except for the below elements. That is, the supporting device 300 includes a neck-bottom 330 provided with a screw groove 335 formed on an inner circumferential surface thereof and connected to the upper surface of the stand 170, and a cylindrical neck 320 provided with screw threads 322 and 324 respectively formed on outer circumferential surfaces of the upper and lower parts thereof and obtained, for example, by injection molding using a transparent material.

During an assembly process of the supporting device 300, the lower screw thread 324 of the neck 320 is threaded into the screw groove 335 of the neck-bottom 330, and the upper screw thread 322 of the neck 320 is threaded into a screw groove 315 of a rear plate 310. A swivel-ring-top 145 is inserted into the through hole 172 of the stand 170, and a swivel-ring-bottom 185 is inserted into a groove 183 at the outside of the through hole 182 of the stand-bracket 180, and the swivel-bracket 190 is connected to the lower part of the neck-bottom 330 by fasteners, such as screws (not illustrated). The swivel-rings 145 and 185 serve as intermediates to facilitate the rotation of the support 300 between the support 300 and the stand 170 and between the support 300 and the stand-bracket 180.

The remaining elements and the assembly process of the supporting device 300 in this embodiment are the same as those of the supporting device 100 in the embodiment shown in FIGS. 1 to 5C, so detailed description of those elements will be omitted for conciseness.

Figure 8A:
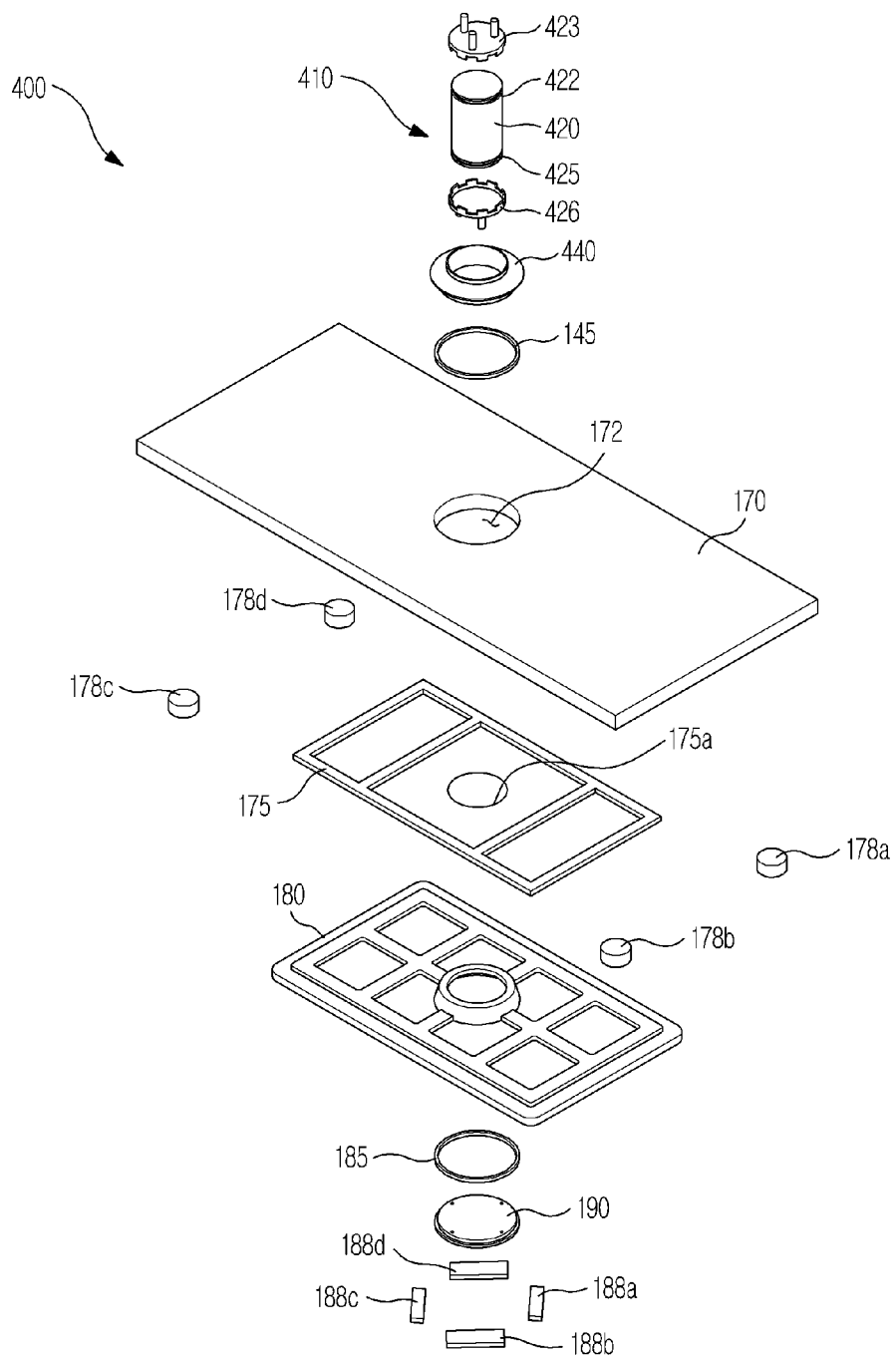
FIG. 8A is an exploded perspective view illustrating a supporting device in accordance with another exemplary embodiment of the present general inventive concept.
Figure 8B:
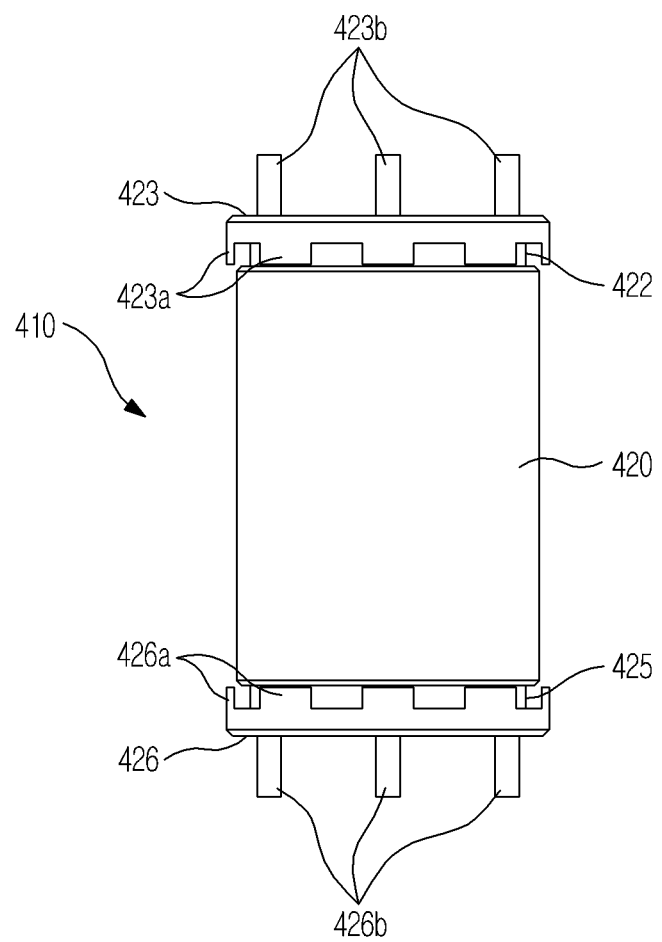
FIGS. 8B, 8C and 8D are detailed views illustrating an exemplary assembly process of a support.
Figure 8C:
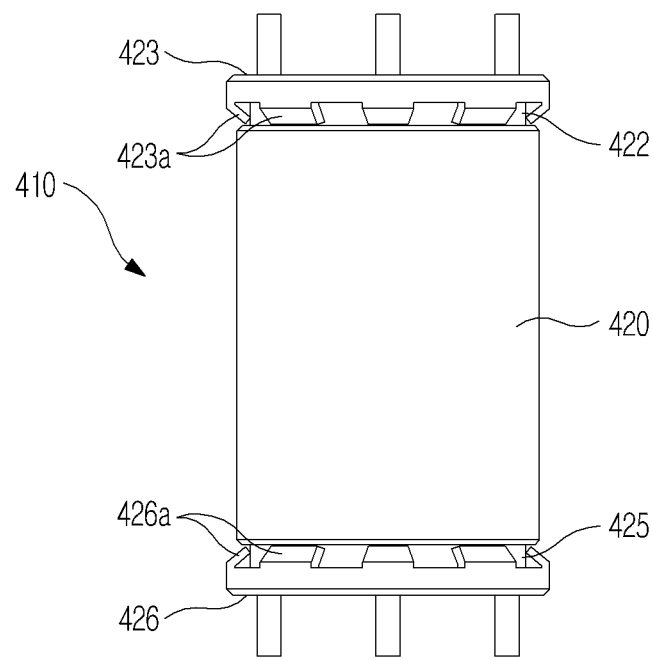
Figure 8D:
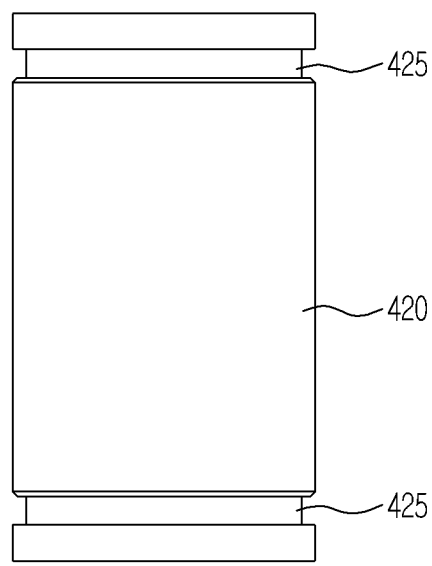

FIG. 8A is an exploded perspective view illustrating a supporting device in accordance with another exemplary embodiment of the present general inventive concept, and FIGS. 8B, 8C and 8D are detailed views illustrating an exemplary assembly process of a support.

With reference to FIG. 8A to 8D, a supporting device 400 in accordance with an exemplary embodiment of the present inventive concept is the same as the supporting device 100 in accordance with the exemplary embodiment illustrated in FIGS. 1 to 5C except for the below elements. That is, a support 410 of the supporting device 400 includes a cylindrical neck 420 provided with grooves 422 and 425 respectively formed on the outer circumferential surfaces of the upper and lower parts thereof and obtained, for example, by injection molding using a transparent material (FIG. 8D), and neck-brackets 423 and 426 respectively provided with a plurality of blades 423a and 426a and connected to the upper and lower grooves 422 and 425 of the neck 420.

During an assembly process of the support 410, the blades 423a and 426a of the neck-brackets 423 and 426 are bent and connected to the upper and lower grooves 422 and 425 of the neck 420, thereby fixing the neck-brackets 423 and 426 to the neck 420. Further, the support 410, to which the neck-brackets 423 and 426 are connected, is inserted into a decorative cover 440. Projections 423b of the neck-bracket 423 can be used to connect the support 410 to the rear plate 110. The projections 423b can be fastened to the rear plate 110 by fasteners, such as screws, or the projections 423b can be fitted to corresponding receiving portions in the rear plate 110, and the neck-bracket 423 can be connected to the rear plate 110 by fasteners, such as screws, or by an adhesive, such as a double-side tape. The projections 426b can be fitted to corresponding receiving portions in the swivel-bracket 190, and the neck-bracket 426 can be connected to the rear plate 110 by fasteners, such as screws, or by an adhesive, such as a double-side tape.

The remaining elements and the assembly process of the supporting device 400 in this embodiment are the same as those of the supporting device 100 in the exemplary embodiment illustrated in FIGS. 1 to 5C, so detailed description of those elements will be omitted for conciseness.

Figure 9A:
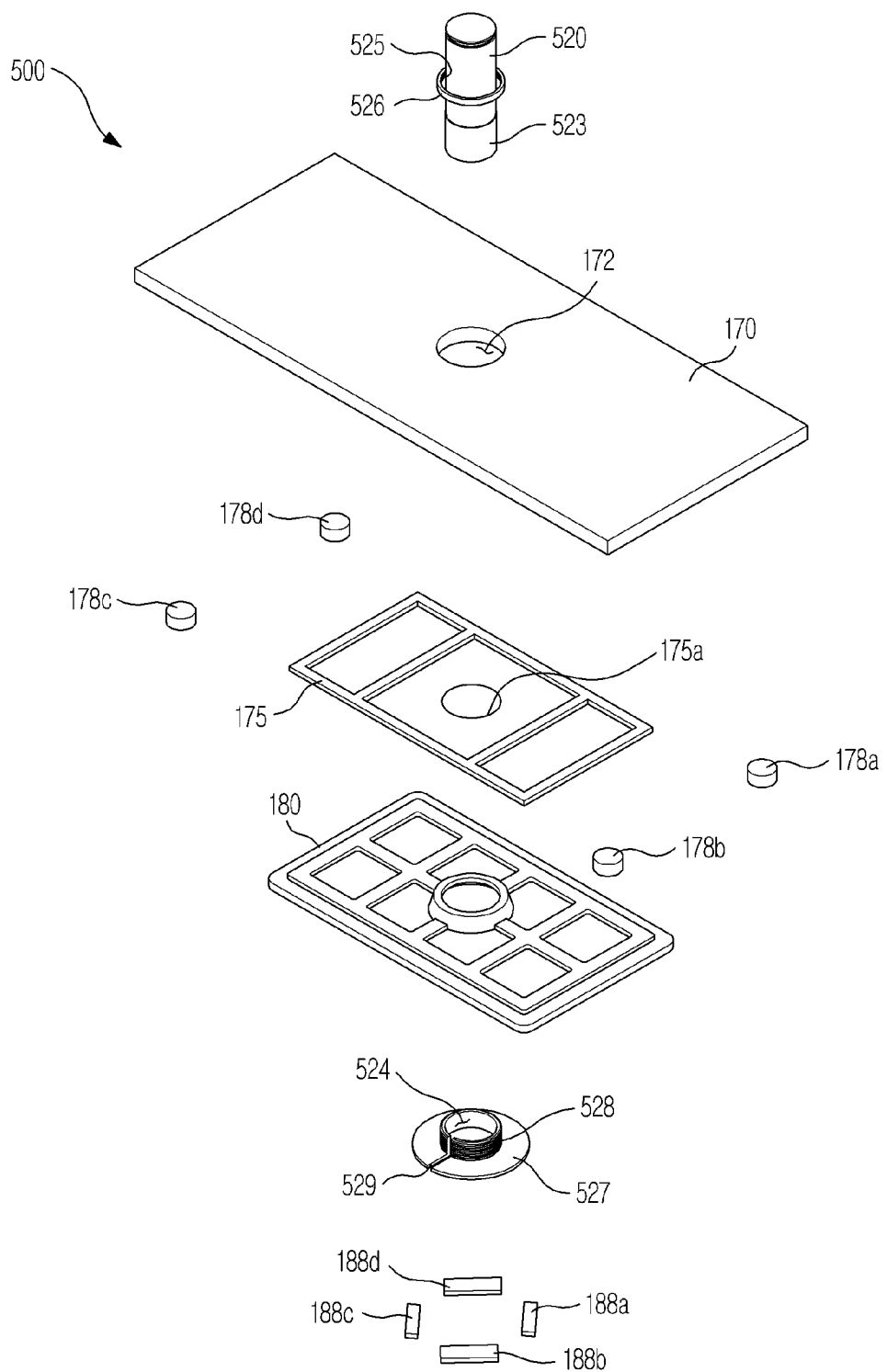
FIG. 9A is an exploded perspective view illustrating a supporting device in accordance with another exemplary embodiment of the present general inventive concept.
Figure 9B:
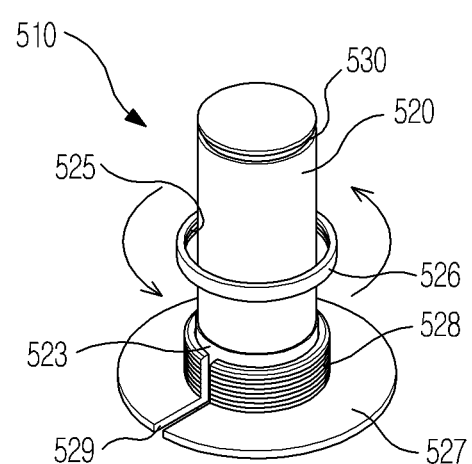
FIG. 9B is a detailed view illustrating an exemplary assembly process of a support.

FIG. 9A is an exploded perspective view illustrating a supporting device in accordance with another exemplary embodiment of the present general inventive concept, and FIG. 9B is a detailed view illustrating an exemplary assembly process of a support.

With reference to FIGS. 9A and 9B, a supporting device 500 in accordance with an exemplary embodiment of the present general inventive concept is the same as the supporting device 100 in accordance with the exemplary embodiment illustrated in FIGS. 1 to 5C except for the below elements. That is, a support 510 of the supporting device 500 includes a cylindrical neck 520 provided with a rubber member 523 inserted into the outer circumferential surface of the lower part thereof and obtained, for example, by injection molding using a transparent material, a neck-holder 527 provided with a screw thread 528 formed on an outer circumferential surface thereof and a cut part 529 formed at one side thereof such that the rubber member 523 is inserted into the neck-holder 527, and a fix-ring 526 provided with a screw groove 525 formed on an inner circumferential surface thereof and threaded to the screw thread 528 of the neck-holder 527 to compress the neck-holder 527 onto the rubber member 523.

During an exemplary assembly process of the supporting device 500, the neck 520 provided with the rubber member 523 and the fix-ring 526 are provided from above the stand 170, and the neck-holder 527 is provided from below the stand-bracket 180, thereby being assembled with each other. Here, since the neck-holder 527 is provided with the cut part 529 at one side thereof, the rubber member 523 is inserted into a hole 524 formed through the central region of the neck-holder 527 while varying the size of the hole 524. Thereafter, the fix-ring 526 is rotated and thus threaded to the neck-holder 527. Then, the size of the hole 524 formed through the central region of the neck-holder 527 is reduced, and thereby the neck-holder 527 is firmly fixed to the rubber member 523 of the neck 520.

The support 510 can also have a groove 530 provided at an upper end thereof. The groove 530 can accommodate a part to fasten the support 510 to the rear plate 110, for example, the neck-holder-top 223 illustrated in FIGS. 6B and 6C, or the neck-bracket 423 illustrated in FIGS. 8A-C, and which can be accommodated to the support 510 to fasten the support to the rear plate 110 substantially as described above.

The remaining elements and the assembly process of the supporting device 500 in this embodiment are the same as those of the supporting device 100 in the embodiment shown in FIGS. 1 to 5C, so detailed description of those elements will be omitted for conciseness.

As is apparent from the above description, in a supporting device for a display unit and a display unit having the same in accordance with exemplary embodiments of the present general inventive concept, a transparent member to support a main body of the display unit can be installed between the main body of the display unit and a cover stand, thereby improving the external appearance of the display unit.

Further, the transparent member can cause the display unit to appear to be mounted on the surface of a wall.

Further, the transparent member can be integrally formed by insert injection molding, thus simplifying a structure of the supporting device for the display unit without any separate additional structure, reducing material costs of the supporting device, and increasing productivity of the supporting device.

Moreover, the transparent member can be formed by insert injection molding under the condition that an extruded rod is inserted into an injection mold, and thus can have a reduced cooling time.

Although a few exemplary embodiments of the present general inventive concept have been illustrated and described, it would be appreciated by those skilled in the art that changes may be made in these exemplary embodiments without departing from the principles and spirit of the general inventive concept, the scope of which is defined in the claims and their equivalents.

What is claimed is:

1. A supporting device usable with a display unit, comprising:
 a support connected to a main body of the display unit; and
 a stand connected to a lower part of the support,
 wherein the support includes a single-piece transparent member formed by injection molding using a transparent material, and the single-piece transparent member is disposed between the display unit and the stand to support the main body of the display unit,
 wherein the single-piece transparent member includes a transparent core part and a transparent injection molded part surrounding all external surfaces of the transparent core part to form an external appearance of the single-piece transparent member.

2. The supporting device according to claim 1, wherein the transparent member is formed by insert injection molding, in which the injection molded part is formed by inserting the core part into an injection mold and then carrying out injection molding at the all external surfaces of the transparent core part.

3. The supporting device according to claim 1, wherein the transparent core part includes an extruded rod formed by extrusion molding.

4. The supporting device according to claim 1, wherein the transparent core part is transparent and colored.

5. The supporting device according to claim 1, wherein the transparent member includes at least one selected from the group consisting of polycarbonate, acryl, and crystal.

6. The supporting device according to claim 1, further comprising a decorative cover disposed between the support and the stand and surrounding an outer circumferential surface of a lower part of the support when the lower part of the support is inserted into the decorative cover.

7. The supporting device according to claim 1, further comprising a rear plate coupled with the display unit to connect the display unit and the support.

8. The supporting device according to claim 1, further comprising a stand-bracket connected to a lower surface of the stand opposite from a surface of the stand facing the display unit.

9. The supporting device according to claim 8, further comprising a swivel-bracket connected to the support via through holes respectively formed at central regions of the stand and the stand-bracket.

10. The supporting device according to claim 9, further comprising a swivel-ring-top interposed between the support and the stand to allow the display unit to be rotatable.

11. The supporting device according to claim 10, further comprising a swivel-ring-bottom interposed between the stand-bracket and the swivel-bracket to allow the display unit to be rotatable.

12. The supporting device according to claim 8, wherein each of the stand and the stand-bracket further includes at least one rubber foot formed at corners of the lower surface thereof to support the stand and the stand-bracket on a mounting surface of the display unit.

13. The supporting device according to claim 7, wherein:
the transparent member includes a neck; and
the support further includes neck-holder-tops provided at an upper part of the neck and connected to the rear plate to prevent separation of the neck from the rear plate, and neck-holder-bottoms provided at a lower part of the neck and connected to the stand to prevent separation of the neck from the stand.

14. The supporting device according to claim 13, wherein the neck, the neck-holder-tops, and the neck-holder-bottoms are integrally formed by injection molding.

15. The supporting device according to claim 14, wherein the support further includes a bracket-neck connected to the lower part of the transparent member.

16. The supporting device according to claim 13, wherein:
the neck-holder-tops include a first neck-holder-top and a second neck-holder-top interconnected by fasteners, and the first neck-holder-top and the second neck-holder-top are connected to a groove formed on the upper part of the neck; and
the neck-holder-bottoms include a first neck-holder-bottom and a second neck-holder-bottom interconnected by fasteners, and the first neck-holder-bottom and the second neck-holder-bottom are connected to a groove formed on the lower part of the neck.

17. The supporting device according to claim 7, further comprising a neck-bottom provided with a screw groove formed on an inner circumferential surface thereof and connected to an upper surface of the stand, wherein:
the transparent member includes a neck made of a transparent material and provided with screw threads respectively formed on an outer circumferential surfaces of upper and lower parts thereof; and
the screw thread at the lower part of the neck is threaded to the screw groove of the neck-bottom, and the screw thread at the upper part of the neck is threaded to a screw thread formed on the rear plate.

18. The supporting device according to claim 7, wherein:
the transparent member includes a neck made of a transparent material and provided with upper and lower grooves respectively formed on outer circumferential surfaces of upper and lower parts thereof, and the support further includes neck-brackets respectively provided with a plurality of blades to connect to the upper and lower grooves of the neck, wherein the plurality of blades are bent to connect the neck-brackets to the neck.

19. The supporting device according to claim 7, wherein:
the transparent member includes a cylindrical neck provided with a rubber member inserted into an outer circumferential surface of a lower part thereof; and
the support further includes a neck-holder provided with a screw thread formed on an outer circumferential surface thereof and a cut part formed at one side thereof wherein the rubber member is inserted into the neck-holder, and a fix-ring threaded to the screw thread of the neck-holder to compress the neck-holder onto the rubber member.

20. A supporting device usable with a display unit, comprising:

a stand disposed to have a distance with a main body of the display unit; and
a support connected to the stand and the main body, disposed between the stand and the main body, and having a single-piece transparent member made of a transparent material to be disposed within the distance between the stand and the main body,
wherein the single-piece transparent member includes a transparent core part and a transparent injection molded part surrounding all external surfaces of the transparent core part to form an external appearance of the single-piece transparent member.

21. The supporting device of claim 20, wherein the transparent member of the support is exposed to an outside thereof between the stand and the main body.

22. The supporting device of claim 20, wherein:
the support further comprises an upper part connectable to the main body and a lower part connectable to the stand; and
the upper part and the lower part are made of one of the transparent material and a non-transparent material.

23. The supporting device of claim 22, wherein the upper part and the lower part are not exposed to an outside thereof, and the transparent member is exposed to the outside thereof between the stand and the main body.

24. The supporting device of claim 20, wherein the support having the transparent member is movable with respect to at least one of the main body and the stand.

25. The supporting device of claim 20, wherein the support having the transparent member is movable together with one of the main body and the stand and is not moveable with respect to the other one of the main body and the stand.

26. A display unit comprising:
a main body having a screen to display an image; and
a supporting device to support a main body with respect to a reference surface, and comprising:
a stand disposed to have a distance with the main body of the display unit with respect to the reference surface; and
a support connected to the stand and the main body, disposed between the stand and the main body, and having a single-piece transparent member made of a transparent material to be disposed within the distance between the stand and the main body,
wherein the single-piece transparent member includes a transparent core part and a transparent injection molded part surrounding all external surfaces of the transparent core part to form an external appearance of the single-piece transparent member.

27. The display unit of claim 26, wherein the transparent member has a height to correspond to the distance in a direction having an angle with the reference surface and has a width narrower than a width of the stand and the main body in a direction corresponding to the reference surface.

28. The display unit of claim 27, wherein the transparent member is exposed to an outside thereof between the stand and the main body when the stand and the main body are connected through the support.

29. The supporting device according to claim 1, wherein the transparent core part is immovably fixed to the transparent injection molded part.

30. The supporting device of claim 20, wherein the transparent core part is immovably fixed to the transparent injection molded part.

31. The display unit of claim 26, wherein the transparent core part is immovably fixed to the transparent injection molded part.

* * * * *